United States Patent [19]

Phirippidis

[11] Patent Number: 5,025,964
[45] Date of Patent: Jun. 25, 1991

[54] UNIVERSAL MODULAR CATALOG AND SAMPLES ORGANIZER FOR VEHICLES

[76] Inventor: George A. Phirippidis, 5815 Commerce Dr., Fremont, Calif. 94555

[21] Appl. No.: 550,714

[22] Filed: Jul. 9, 1990

[51] Int. Cl.⁵ .................. B60R 7/00; A47F 3/14; A47F 3/00
[52] U.S. Cl. .................. 224/42.42; 211/126; 296/37.1; 312/117
[58] Field of Search ............... 224/42.42, 277, 311, 224/314, 320; 296/37.1, 37.5, 37.6, 37.8; 312/35, 117, 183, 233, DIG. 33; 206/44.11, 424; 220/23.4, 23.83, 23.86, 533; 211/126, 184

[56] References Cited

U.S. PATENT DOCUMENTS

| | | | |
|---|---|---|---|
| 1,189,371 | 7/1916 | Lyons | 211/126 |
| 2,257,536 | 9/1941 | Roycroft | 211/184 |
| 3,528,716 | 9/1970 | Lapertosa | 312/183 |
| 4,717,024 | 1/1988 | Djezovic | 206/581 |
| 4,718,584 | 1/1988 | Schoeny | 224/42.42 |

Primary Examiner—Henry J. Recla
Assistant Examiner—Antoine Gamarra
Attorney, Agent, or Firm—Jacques M. Dulin; Tom C. Feix

[57] ABSTRACT

A universal modular vehicle organizer assembly particularly useful for car trunks and van backs to retain in an organized fashion sales literature, catalogs, samples and parts for use by sales and repair people. The system comprises at least one trough-like angular shelf member supported on at least a pair of upstanding end walls and having sheet dividers with tabs that interlock in slots provided in the trough walls. The end walls have hand holds for ease in removing the unit from the vehicle trunk. Lips provided along the leading edge and back edge of the trough, and at the upper edge of the side walls engagingly retain special auxiliary boxes which are generally rectangular in shape with a higher rear wall that has the same vertical dimension as from the bottom of the trough organizer to the underside of the lip. The auxiliary boxes may have hand holds in their short end walls and one in the back wall which is aligned with the hand hold in the side support wall of the trough member. The auxiliary boxes typically have bottoms and sheet type separators with tab/slot interlocks. The preferred material is light sheet metal. The auxiliary boxes optionally have drop-on or hinged lids which may have handles and latches which may be lockable. Retaining means such as bungee cords or a retractable roller-mounted flexible cover may be provided for the catalog trough. The assembly provides a system for keeping catalogs, order blanks, parts and samples neatly organized so that they do not become damaged, soiled or scrambled during transport, saving the sales or service representative valuable time. It also permits quick conversion of the vehicle to other uses by simply lifting out the modular components.

21 Claims, 3 Drawing Sheets

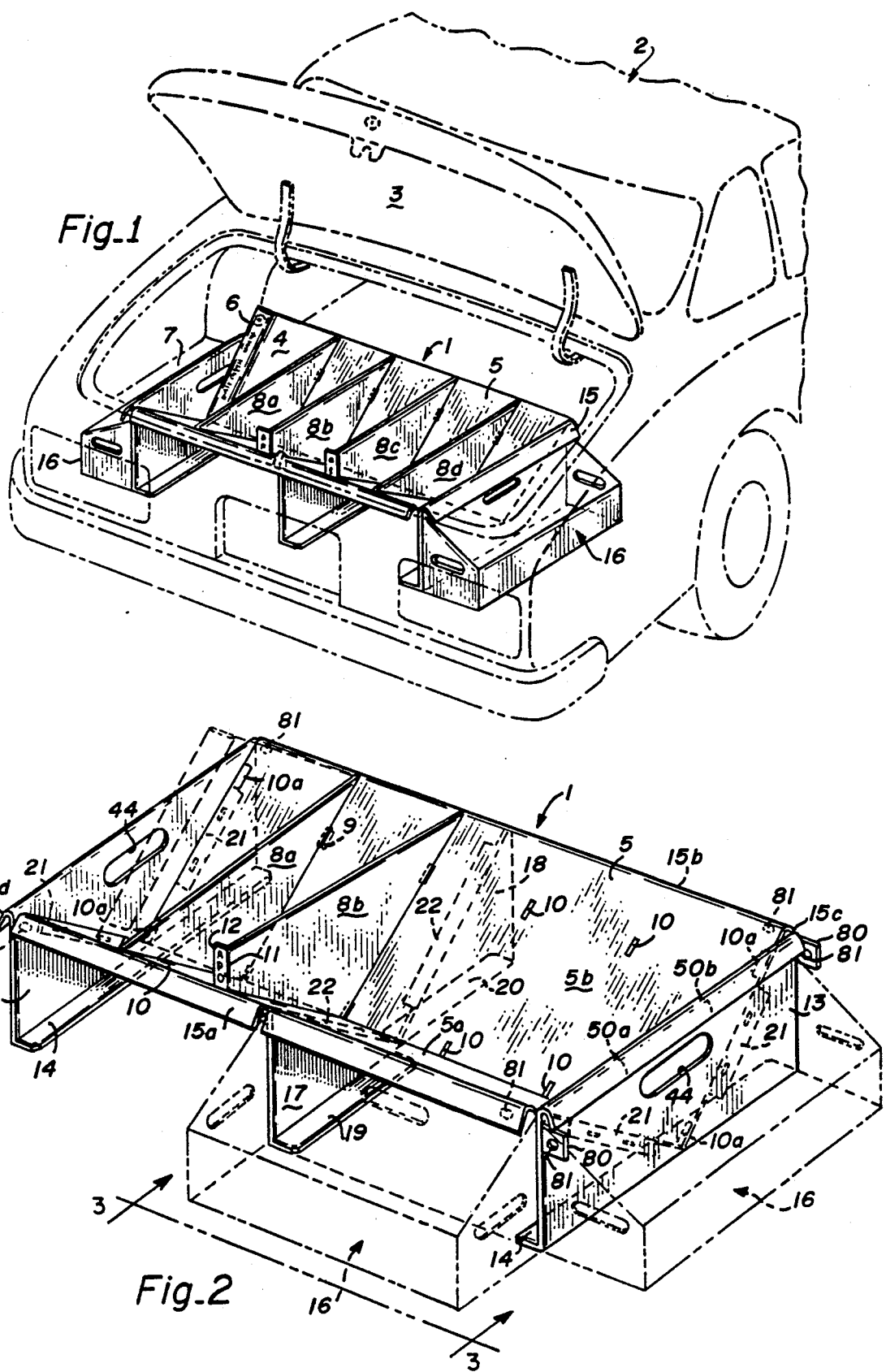

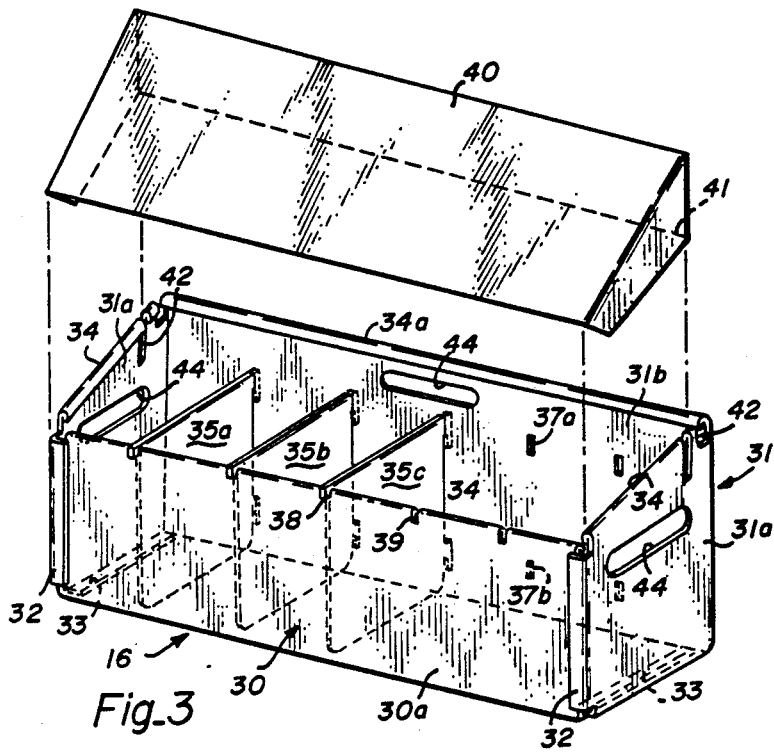
Fig_3
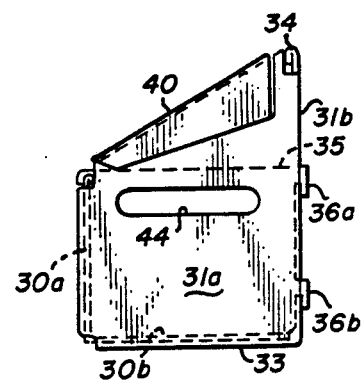
Fig_3a
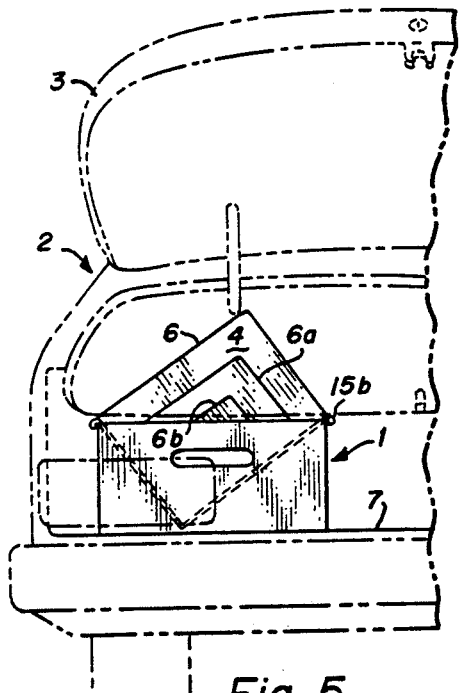
Fig_5
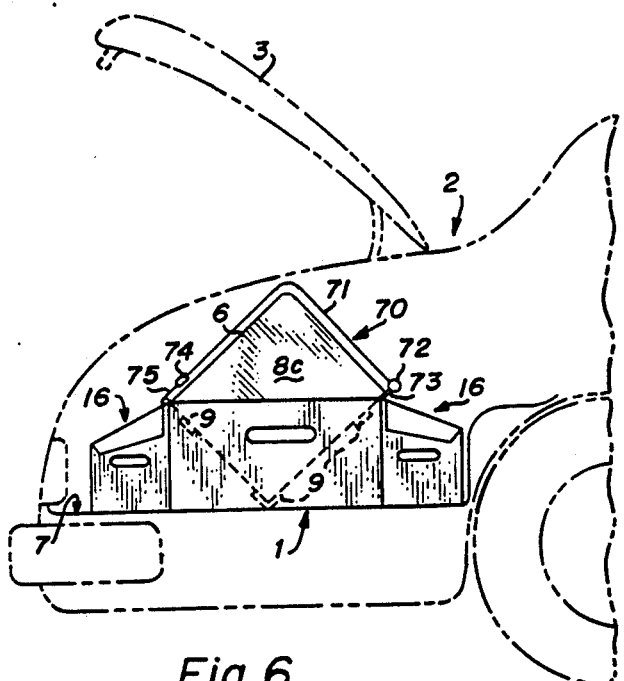
Fig_6

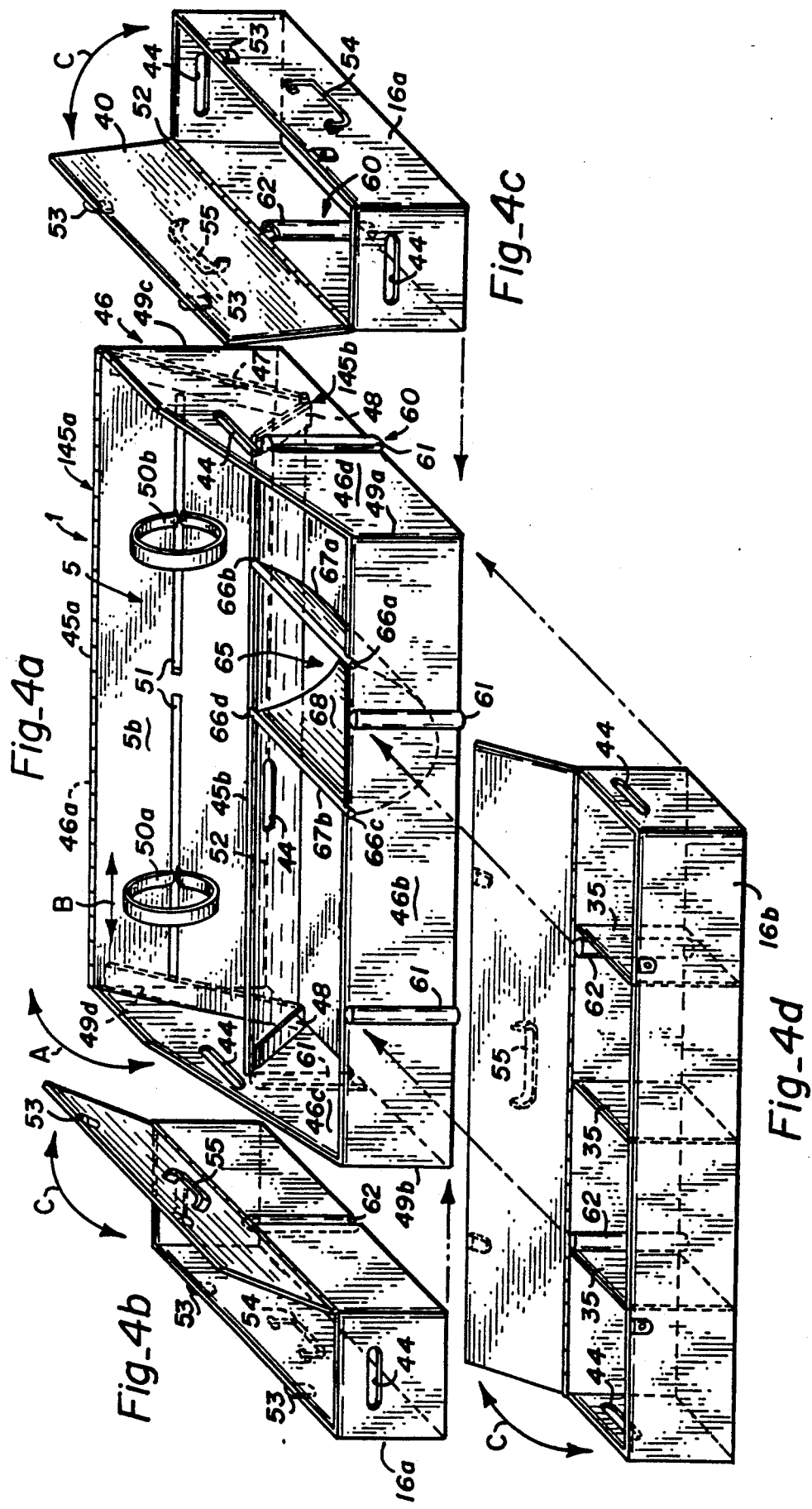

UNIVERSAL MODULAR CATALOG AND SAMPLES ORGANIZER FOR VEHICLES

FIELD

This invention relates to universal modular storage and organizing assemblies for the orderly stowing of samples, literature and other sales aids for convenient access in the trunk of a vehicle or back of a van, and particularly to a multiple storage bin assembly featuring removable modular components, at least one of which has a trough-like shelf for catalogs and sales literature, which assemblies are lightweight, strong and securely store literature preventing it from becoming soiled and mixed-up during travel.

BACKGROUND

There are numerous occupations, e.g. sales, where it is convenient or necessary to carry an assortment of tools, samples, utensils, etc. in the trunk of an automobile or back of a van from one location to another. Various patents have been issued in an attempt to accommodate some of the requirements for safe transport.

U.S. Pat. No. 4,832,242 to Leek is for a portable automobile trunk organizer for storing automobile accessories. Flares, jumper cables, tire irons, etc. may be attached for storage to the underside of a lid that covers a table. The table is mounted on four legs supported on the floor of the trunk. When the trunk lid is opened, the top is tilted up and off the table providing access to the stored items. The table has recessed compartments for storing oil, greases, etc.

U.S. Pat. No. 678,027 to Peddicord is for a case in which shirts may be stored and conveniently displayed when the case is opened. Restraining straps are used to retain the shirts in position.

There have also been patented various devices for binding objects together for convenience in storing and transportation.

U.S Pat. No. 4,836,343 to Arney is for a construction intended to bind pieces of luggage together.

U.S. Pat. No. 3,999,818 to Schrankler is for a system whereby containers for microfilm, etc., may be bound together.

U.S. Pat. Nos. 4,244,632 to Molinari and 4,538,861 to Hughes are for a calligrapher's case disclosing a hinged lid that opens to provide a writing surface.

The travelling salesman and members of related occupations are required to travel from place to place, carrying various aids, e.g. samples, catalogs, pamphlets, books, etc. which are displayed in demonstrations and sales presentations. In many cases, the number of catalogs that are needed to fully include all products are so numerous that storage of such items in the trunk of an automobile for transportation purposes presents a serious problem that interferes with an effective presentation to the customer. This is particularly the case for the sales person whose company has many items in its products line, or who is a sales rep for more than one company, or who must leave fresh copies of catalogs and other sales literature, order blanks, etc., with numerous customers.

Many sales people travel 50,000 to 100,000 miles/year or more in autos making calls. Catalogs can easily get soiled, destroyed or disorganized from the normal movement of the auto. Further, a well organized catalog retaining system would save the sales person valuable time in selecting the pertinent few catalog(s) from among the many that he/she may be required to carry. Also, it is frequent practice for the salesperson, repairman, etc. to invite the customer out to the car to pick out samples, parts, catalogs, etc., and presentation of a jumbled mess in a car trunk is not a good sales tactic.

None of the storage systems disclosed above are constructed to accommodate these special requirements. Accordingly, there is a need for improved car trunk organizers which overcome the disadvantages of the prior art.

THE INVENTION

Objects

It is an object of this invention to provide a modular car trunk organizer system for orderly storing of catalogs, pamphlets, samples, parts, etc., such as required by a salesman or repairman for demonstrating his products and making sales, and for presentation to customers.

It is another object to provide a modular car trunk storage system which comprises modules that may be quickly and securely interlocked, but which may be easily and quickly detached and removed for replacement by another module containing more or different catalogs or items, or removed simply to provide more space in the trunk for other items when that is required.

It is another object of the invention is to provide a removable modular car trunk storage system including a section that is particularly adapted to the storage of literature that can be maintained separate from hardware (sample) items.

It is another object to provide a dedicated car trunk organizer for catalogs which has moveable or insertable partitions which maintain catalogs in place when less than a full complement are being transported, thus preventing them from sliding around and becoming damaged or disorganized.

These and other objects will be apparent from a review of the Specification, Drawings and Claims.

DRAWINGS

The invention is illustrated in more detail in the figures in which:

FIG. 1 is a perspective view of the universal modular car trunk organizer of this invention disposed in the use position in the trunk of an automobile.

FIG. 2 is a perspective of the organizer shown in FIG. 1, showing details of its construction and the use of the auxiliary side and front samples boxes.

FIG. 3 is a perspective view of the auxiliary parts box, with the lid exploded off the top.

FIG. 3A is an end elevation view of the parts box of FIG. 3.

FIGS. 4 and 4a–4d show another embodiment of the universal modular trunk organizer of this invention.

FIG. 5 shows an alternate orientation of the organizer for access from the side of the car.

FIG. 6 shows a side elevation of the orientation of the organizer in a trunk with the addition of auxiliary parts boxes in the front and back of the organizer.

SUMMARY

This invention is directed toward a universal modular organizer for an automobile trunk or van back which, in a principal embodiment, includes a main box, preferably bottomless, with a V-shaped trough contoured to form an angled, recessed shelf for the storage of literature (catalogs, brochures, reference manuals, order forms, etc.) and end support walls spanning the trough. The trough may be fixed or hinged along one longitudinal edge to provide access thereunder. Smaller modular boxes, which are particularly useful for parts, samples, etc. are removably attachable to or engageable with the outside surfaces of the main box.

In another embodiment, the main box includes an upstanding front wall and a parallel, taller rear wall, which walls are joined to one another by the opposed parallel side walls. The V-shaped trough/shelf member is optionally provided with a rear edge hingeably attached to the top edge of the rear wall. The shelf in cross-section comprises a V-shaped right angled trough having a bottom edge (the trough apex) parallel to the front and back (hinged) edge, so that books, catalogs, order forms, literature, etc., may be stored on top of and supported by the shelf (lid), while samples of the salesman's wares or other items may be stored in the container volume underneath the shelf between the walls.

Divider means, e.g. panels, may be removably attached to the shelf by a tab and slot system to form individual bins of various sizes, which divider means serve to separate the various brochures, pamphlets, etc. from one another. A retaining member, e.g. a flexible cover, strap, bungee cord(s) or coil spring(s) optionally may be attached to the opposed sides, or to the front and back edges of the main box, and stretched across the array of literature to secure the literature during transit.

Smaller modular auxiliary containers may be removably secured to the outside of the front, back and side walls by a lip on the main box, or by interengaging slide means, e.g. a tongue and groove construction, when it is desired to make the system larger to accommodate more samples/catalogs, or for larger car trunks. Small containers may be secured inside the boxes when it is desired to maintain various items in separate locations. In an alternate embodiment, selected areas of the interior of the main box may be provided with one element of Velcro TM lining (e.g. loops) for securing smaller boxes having the opposite Velcro TM member (e.g. hooks) inside the large box.

The main box typically has no bottom, but may have if desired. They also have specially designed and located hand holds to permit removal from and placement into the vehicle. The auxiliary add-on boxes typically have bottoms and may have lids with or without handles. The lids may be latchable and/or lockable to a side wall for security purposes. The smaller auxiliary boxes are easily disengaged from the main catalog trough unit for carrying into the customer's location to display parts or samples carried therein.

While the presently preferred best mode is to construct the boxes of sheet metal, e.g. 6–20 gauge galvanized steel or aluminum, they may be made of any suitable material of adequate strength and rigidity for the particular catalogs used, e.g. injection molded plastic of styrene/butadiene copolymers, glass-fitted resin, ABS, polypropylene, acrylics, acrylic copolymers, etc. In addition wire rack, aperatured sheet, or egg crate structure may be employed.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Turning now to FIGS. 1, 2, 3, 3a and 6, the universal modular organizer 1 of this invention is shown in FIG. 1 disposed in the trunk of an automobile 2 which is shown in phantom with its trunk 3 being in the raised position. This provides the sales or repair person access to the sales catalogs, manuals, literature, order blanks, etc. 4 which are disposed in the trough member 5 so that the spine of the catalog 6 is readily visible to the sales person upon opening the trunk. The vertex of the trough is oriented downwardly to form the trough and angled so the book spines are inclined from the horizontal (i.e., parallel to the back plate of the trough) about 30°–60°, preferably 45°. This permits the sales person to easily view and remove the appropriate book(s).

FIG. 6 shows in a side elevation view how the unit 1 is disposed on the floor 7 of the car trunk. The trough has a series of dividers 8A–8D (FIGS. 1, 2 and 6) of generally triangular configuration which have tabs 9 which fit into appropriately oriented slots 10 in the trough. The number of dividers and their receiving slots may be chosen to be any suitable number. The divider 8b (FIG. 2) is an alternative embodiment having a raised front portion 11 which permits a label 12 to be placed thereon to assist in identifying various catalogs, brochures, sales materials, etc. in that appropriate bin area. FIG. 6 also shows the provision of an enlarged square or rectangular end plate 8e which is of sheet metal and has tabs 9 along the bottom edges to engage the slots 10a positioned adjacent the respective end walls 13 (see FIG. 2). This provides a removable full size end plate which assists in keeping flexible materials from flopping sideways over the end walls 13.

As shown in FIGS. 1 and 2, the trough 5 is supported at each end by an upstanding end wall 13 which conveniently has an inturned flanged foot 14. Each end wall has an aperture hand hold feature 44 disposed in the area spanning the front and back plates, 5a and 5b respectively, of the trough 5 which permits the removal of the entire unit from the car trunk. The end walls are typically 6–9" in height, which permits access to the recesses of the trunk behind the unit. The end walls may be taller to provide for ease of removal and/or inclusion of drawers or horizontal shelves (not shown).

There is also one or more outwardly angled lips 15a–15d which are extensions of the upper edges of the side walls and trough plate members. This lip engages the auxiliary sample box 16 shown in phantom in FIG. 2 and shown in solid in FIGS. 1 and 6. That box is detailed in FIGS. 3 and 3a.

As noted best in FIGS. 1 and 2, the upper edge of the rear wall of the auxiliary box 16 fits under and is engaged by the lip 15 so that the box is retained in place in the vehicle.

The center of the trough optionally may be supported by one or more triangular-shaped supporting legs 17 and 18. As shown, the support leg 17 has a right angled foot 19 directed to the right, while the foot 20 on leg 18 is oriented to the left. The trough may be secured to the end wall by the flanges 21, and the intermediary feet 17 and 18 may be attached by means flanges 22. These flanges can be secured to the mating piece by appropriate fastening means such as screws, spot welding, or a series of slots in one piece with engaging tabs in the mating piece.

The modular nature of the invention is illustrated by comparing FIGS. 2, 4, 5 and 6. The normal orientation of the catalog trough 1 is transverse to the front/back axis of the automobile so that upon raising the trunk lid as shown in FIG. 1, the catalogs spines are visible from the rear of the car. However, in an appropriately sized automobile, the organizer unit 1 can be oriented parallel to the front/back axis of the automobile 2 as shown in FIG. 5. This permits the catalogs and literature to be visible and accessible from the side of the car. As shown, it is visible from the left side of the car area 25. To accommodate the slope of the trunk line, where there is one, smaller catalogs such as 6a or 6b can be placed at one end of the trough where there is less trunk clearance.

As shown in these figures, the auxiliary parts or sample box 16 may be placed on one or more sides of the catalog trough (FIGS. 1 and 2), or may be placed in the front and back as shown in FIGS. 2 and 6. Further, the auxiliary box 16 is preferably dimensioned to equal the front-back depth of the catalog trough which is approximately half the width of the trough. Thus, two auxiliary boxes 16 would be placed side-by-side across the front of the trough as best illustrated in FIG. 2.

Likewise, the trough may be any modular width desired. A convenient width is 28 inches and depth 14 inches. However, in the case of the smaller vehicles, the trough could be half width, that is 14 inches between the left and right side (end) walls 13 (to where the center support legs 17 and 18 are presently shown in FIGS. 1 and 2). Thus, two or three of the troughs could be placed side-by-side to give a width of 28 or 42 inches, respectively, with the appropriate number of auxiliary boxes 16 placed on the side, front or back as shown. In this case one or more opposite lips are omitted so complementary units can be butted together. That is, lip 15c is omitted from a left unit while 15d is omitted from the right unit so two trough units can be placed together with end walls 13 abutting. Alternately a "center" trough unit can have lips 15c and 15d which engage the left side wall of a right end lipless second trough unit positioned on the right, and/or a left end lipless third through unit positioned on the right. In this manner the vertical lipless end wall of the corresponding second and or third box engages under the lips of the center box side walls.

Turning now to FIG. 3, the auxiliary box 16 is preferably made of two sheet metal plates, a front/bottom plate 30 and a side/rear plate 31 These two sheets are conveniently bent from suitable sheet metal and then engaged by spot welding, screws, glue or appropriate tab and slot arrangement as described above. As shown in FIG. 3, the front/bottom plate 30 is a right angled plate which is retained by flange 32 on the front leading edge of the side panel portion 31a of the side/back panel 31. It is also engaged by a bottom panel 33 best shown in FIG. 3a which extends inwardly from the bottom edge of the side panel 31a. Conveniently, a rolled edge 34 may be provided on the appropriately exposed edges of the metal so that the user does not cut his or her hands in use. This is best shown in FIGS. 3 and 3a as applying to the auxiliary samples box, but it should be understood that it also applies to the main trough embodiments of FIGS. 1, 2, and 4.

The auxiliary parts/sample box 16 may also conveniently have a series of dividers 35a, b, c, etc. These dividers, as best seen in FIG. 3 and 3a are generally rectangular sheets with rear tabs 36a and 36b which engage appropriate slots 37a and 37b, and a front tab 38 which fits in notch 39 in the upper edge of the front face of 30a of the plate 30. This assembly may also conveniently carry a hinged or drop-on type lid 40. As shown in FIGS. 3 and 3a, the lid 40 is a sheet metal lid which has a rear panel 41 which fits into and engages slot 42 in each of the side panels 31a of the panel 31. An appropriate lock or latch may be employed (not shown). In addition, hand holds 44 may be provided in each end, and/or in the rear wall of the box. The upper rear edge 34a of the box will engage under the lip 15 of the trough or end wall as shown in FIGS. 1, 2, and 6.

Turning now to FIG. 4, in this embodiment of the invention, the trough 5 is hinged at its rear back edge 45a to a frame comprised of four vertically upstanding side walls 46. The frame includes a back wall 46a, a front wall 46b, and two side walls 46c and 46d. As shown, the side walls 46c and 46d optionally extend forward substantially further than the front lip 45b of the trough 5. This provides a front space of irregular dimensions which can receive additional materials such as samples, literature, catalogs, hanging files, etc.

Further, as shown by arrow A and FIG. 4a, the hinge 145a along the upper rear edge 45a permits the trough to be rotated upwardly to provide access to the space 47 underneath the trough. The trough is supported by flanges 48 aligned and secured to the sidewalls 46c and 46d respectively. Alternately, the back plate 5b of the trough 5 may be fixed to or rest on the vertical rear wall 46a and the hinge 145b is placed in the vertex of the trough so that the user merely pivots the front plate 5a back toward the back plate 5b for access. The joining edges 49a, b, c, d of the vertical side walls may be hingedly joined to one another, or otherwise may be easily assembleable and disassembleable (e.g., by a tab and slot, or pin and tube construction) so the entire trough unit can knock down flat for shipping and storage. In this embodiment the trough is hinged at the vertex and merely "drops in" the box walls, the rear lip 15b of the trough back plate 5b engaging the rear wall 46a and being supported by angled flanges 48 in the end walls 46c and 46d, respectively.

In this embodiment, the dividers may be as shown in the embodiment of FIGS. 1, 2, and 3. Alternately, a lateral sliding loop spring type of divider 50 may be employed (FIG. 4). This divider comprises a ribbon of suitably springy material which permits outwardly turned ends to be compressed together so they can fit into slot 51. Then the spring-like nature of the material permits the outwardly turned ends to engage the upper and lower edges of the slot 51 to retain it in position. The dividers may be moved laterally very simply by grasping them and compressing them together as shown by the left hand spring divider in FIG. 4a. Then the divider may be moved laterally as shown by arrow B. Once the proper position is obtained, the loop is released and it will stay in position as shown by the right hand divider 50b as shown in FIG. 4a.

The auxiliary boxes 16a and b shown in FIGS. 4b and 4c (box 16a) and in FIG. 4d (box 16b) may be of the same or similar construction as the box shown in FIG. 3. In this embodiment however, the upper lid 40 is hinged at 52, and may be secured by the latch assemblies 53. The boxes may conveniently have handles 54 or side openings for hand holds 44. Likewise the top may have a handle 55. Similarly, dividers 35 may be provided in one or more of the boxes.

In the embodiments shown in FIG. 4 a rib and keyway (tongue and groove) system 61-62 may be employed. This system comprises a rib 61, preferably on the exterior of the main box assembly 1, which engages keyways 62 formed in the back wall of the auxiliary parts of boxes 16a and 16b. These boxes are slid vertically down over the rib so that they do not move during transport.

Also shown is a sling system 65 in the main box 1. This comprises a series of aligned notches 66a, b, c and d in the upper edge of the front wall 46b of the main box 1 and the upper edge of the forward lip of the trough 5. This permits placement of other loose small items. The material 68 may be solid, webbed or netlike. The main box 1 shown in FIG. 4a may optionally include a bottom. Typically the auxiliary boxes 16a and b have bottoms. If desired, the trough assembly 1 of FIGS. 1 and 2 may also include a bottom and a front and back. Where desired, slide-in trays may be used spanning between outer side walls 13 and the center support feet 17, 18.

The bottom flanges 14, 19 and 20 of the end 13 and intermediate walls 17 and 18 may contain some non-skid material such as rubber feet that are glued to the underside, or are engaged within holes in the flanges (not shown). It is preferred however to use hook-type Velcro ™ material which can engage the fabric type floor mats in the trunk of the automobile. This assists in preventing the unit from sliding around the trunk.

As an alternative, a tab 80 (see FIG. 2) may be provided at each of the four corners (only two tabs are shown on the right end of the unit, but it should be understood that they may be placed on all four corners). These tabs may contain holes 81 to receive the hook portions of bungee cords which have hooks at each end. In the alternative, the holes may be placed in any convenient place such as adjacent the upper top margin of the trough 5, or in the lip as shown at each end of the lip 15 (see FIG. 2).

FIG. 6 shows still another alternative feature of the invention. A cover assembly 70 is provided which comprises a solid, preferably opaque, sheet 71 which is mounted on a spring-biased roller 72 (in the fashion of a window shade) which is secured to flange 73 extending upwardly from the back marginal edge of the trough 5 or by tabs extending from the upper rear corner of each of the end panels 13. This protective cover 71 may be unfurled by means of a rod 74 running the full, or part of the, transverse width of the cover (the trough assembly), which rod has a hook 75 which may be conveniently hooked over the front edge of the lip 15. A preferred material is a heavy plastic such a vinyl or plastic coated fabric sheets such as heavy gauge window shade material on the order of 10 mil thickness. This assists in keeping the material in the trough when the car goes over bumps. In addition, when the trunk is open, it keeps wind from disturbing the papers and dust off them. Likewise for the occasion where the cover 71 is opaque, it provides some security as to the contents being carried in the trunk. This embodiment is particularly suitable for use with station wagon or van type vehicles in which there is visual access to the interior space of the vehicle.

Also note in FIGS. 1 and 3 that the back wall 31b of the small auxiliary box has a hand aperture 44 which is aligned with the aperture 44 in the end wall 13 of the main trough unit. In this manner, the user may pick up not only the main trough but one or both of the auxiliary side boxes at the same time.

The angle of the flanges 15 may vary anywhere from 0°-30° (downwardly and outwardly from the vertical), it being preferred that they are from 5°-20°. It is also preferred that the main trough unit be on the order of 12-16 inches in width, that is, being half sized as compared to the 28" wide trough shown in FIG. 2. Note also that in FIG. 2 that the side flanges 15c and/or 15d for engaging the auxiliary box 16 may have the middle section between the lines 50a and 50b omitted so that there is more clearance for the user's hand and wrist upon removing the box. In this way, the user's wrist does not come in chafing or cutting contact with the outer edge of the flange 15c.

The use of the modular system of this invention permits the user to quickly change the stock of available samples by selecting suitable auxiliary boxes or to replenish or change catalogs as needed. In addition, the size of the storage system in the automobile may be quickly changed. Likewise, when the sales person is converting the automobile from business to personal use, the entire assembly, including the various catalogs can be quickly lifted out of the automobile and stored in a garage, home or office. In addition, it is very clear that the materials are conveniently presented for the use by the sales or repair person. The system of the invention is sufficiently sturdy to prevent the catalogs from being damaged, intermixed or lost while being transported in the trunk or back of a vehicle. They remain clean and undamaged, which helps the salesman in his or her presentation to the customer. The salesman arrives at his or her call with the knowledge that the automobile trunk is not a mess, and that he/she can drive up to the place of call, simply open the trunk, slip out the appropriate catalog(s) and sample(s), and go in for the call or invite the customer out to pick out catalogs/samples. This presentation leaves the customer with a positive sense that the sales/repair person is competent and orderly. It also permits better use of the trunk storage space. The literature is storable in bins according to their category and separated from other sales material samples and hardware items, along with provision to expand or contract the storage space as required.

It should be understood that various modifications within the scope of this invention can be made by one having ordinary skill in the art without departing from the spirit thereof. I therefore wish my invention to be defined by the scope of the appended claims as broadly as the prior art will permit and in view of the specification is need be.

I claim:

1. Universal modular storage system for vehicles comprising in operative combination:
   a) a first unit comprising;
      i) a laterally extending trough unit, V-shaped in cross section having a shorter front panel and a longer back panel, each panel having an outer edge;
      ii) the bottom of the trough being oriented downwardly, and said trough being tilted with the vertex of the V oriented so that catalogs, parts books, reference manuals, etc. having a labeled backs are easily presented for reading at an angle within the range of from about 30° to about 60° up from the horizontal;
      iii) a pair of upstanding end walls, one disposed at each end of said trough and bounding the ends of said trough, each of said end walls having disposed in the area spanning the interior of the trough an opening therethrough adapted as a hand hold;

iv) said end walls being securable to said trough to provide a unitary construction;

v) at least one of the outer edges of said trough and said end walls having means for engaging an auxiliary storage unit;

b) at least one auxiliary storage unit removably engaged with said first unit, said auxiliary unit comprising:

i) a plurality of side walls including a front panel, a rear panel spaced from said front panel, and a pair of opposed side panels spaced from each other and connecting said front and said back panel; and ii) said auxiliary unit back panel having means for permitting said auxiliary storage unit to be removably engagable with at least one of said trough end walls or said front or back trough panel.

2. Universal modular storage system for vehicles as in claim 1 which includes a) at least one generally planar trough divider member; and b) means for movably engaging said divider in a selected one of a plurality of lateral positions in said trough to provide variable sized catalog bins therein.

3. A universal modular storage system for vehicles as in claim 2 wherein:

a) said first unit engaging means comprises at least one lip.

4. A universal modular storage system for vehicles as in claim 3 wherein:

a) said auxiliary storage unit includes at least one opening in a side wall disposed to provide a hand hold.

5. A universal modular storage system for vehicles as in claim 4 wherein:

a) said auxiliary unit has a lateral length ranging from the lateral length of the trough to the length of an end wall.

6. A universal modular storage system for vehicles as in claim 5 wherein:

a) the back panel of said auxiliary unit includes an opening adapted as a hand hold disposed aligned with the hand hold in the end wall of said trough unit.

7. A universal modular storage system for vehicles as in claim 5 wherein:

a) said trough unit has lips on the outer edges of the front and back panels thereof, and none on the upper edges of said end walls.

8. A universal modular storage system for vehicles as in claim 5 wherein:

a) said trough unit has lips on the outer edges of the front and back panels thereof, and one on at least one of said end walls.

9. A universal modular storage system for vehicles as in claim 5 wherein:

a) said auxiliary unit includes a lid.

10. A universal modular storage system for vehicles as in claim 9 wherein said lid is hinged along at least one selected juncture of said lid and said rear panel.

11. A universal modular storage system for vehicles as in claim 10 wherein:

a) said lid includes a latch.

12. A universal modular storage system for vehicles as in claim 11 wherein:

a) said latch is lockable.

13. A universal modular storage system for vehicles as in claim 2 wherein:

a) said dividers are generally triangular to conform to the trough shape, and said engaging means is a slot for receivingly engaging a tab in said divider.

14. A universal modular storage system for vehicles as in claim 2 wherein:

a) said divider is generally rectangular and placeable in said trough adjacent at least one trough end wall to retainingly prevent catalogs from flopping over said end wall.

15. A universal modular storage system for vehicles as in claim 2 wherein:

a) said dividers include means for identifying a bin defined between a pair of said dividers or an end wall of said trough unit and said divider.

16. A universal modular storage system for vehicles as in claim 1 wherein one of said panels of said trough is hinged to the other to provide access thereunder.

17. A universal modular storage system for vehicles as in claim 1 wherein one of said panels of said trough is hinged at its outer edge to an upstanding back wall to provide access thereunder.

18. A universal modular storage system for vehicles as in claim 16 wherein said end walls of said trough unit extend forward of the front edge of said trough and a front partition disposed between said end walls to provide additional storage space between the inside of said front partition and the front edge of said trough.

19. A universal modular storage system for vehicles as in claim 1 wherein which includes:

a) means for retaining catalogs in said trough including at least one member extendable across said trough to prevent said catalogs from coming out of said trough during movement.

20. A universal modular storage system for vehicles as in claim 19 wherein:

a) said catalog retaining means extends from the back panel to the front panel of the trough.

21. A universal modular storage system for vehicles as in claim 19 wherein:

a) said catalog retaining means includes a cover of flexible sheet material.

* * * * *